Figure 1:
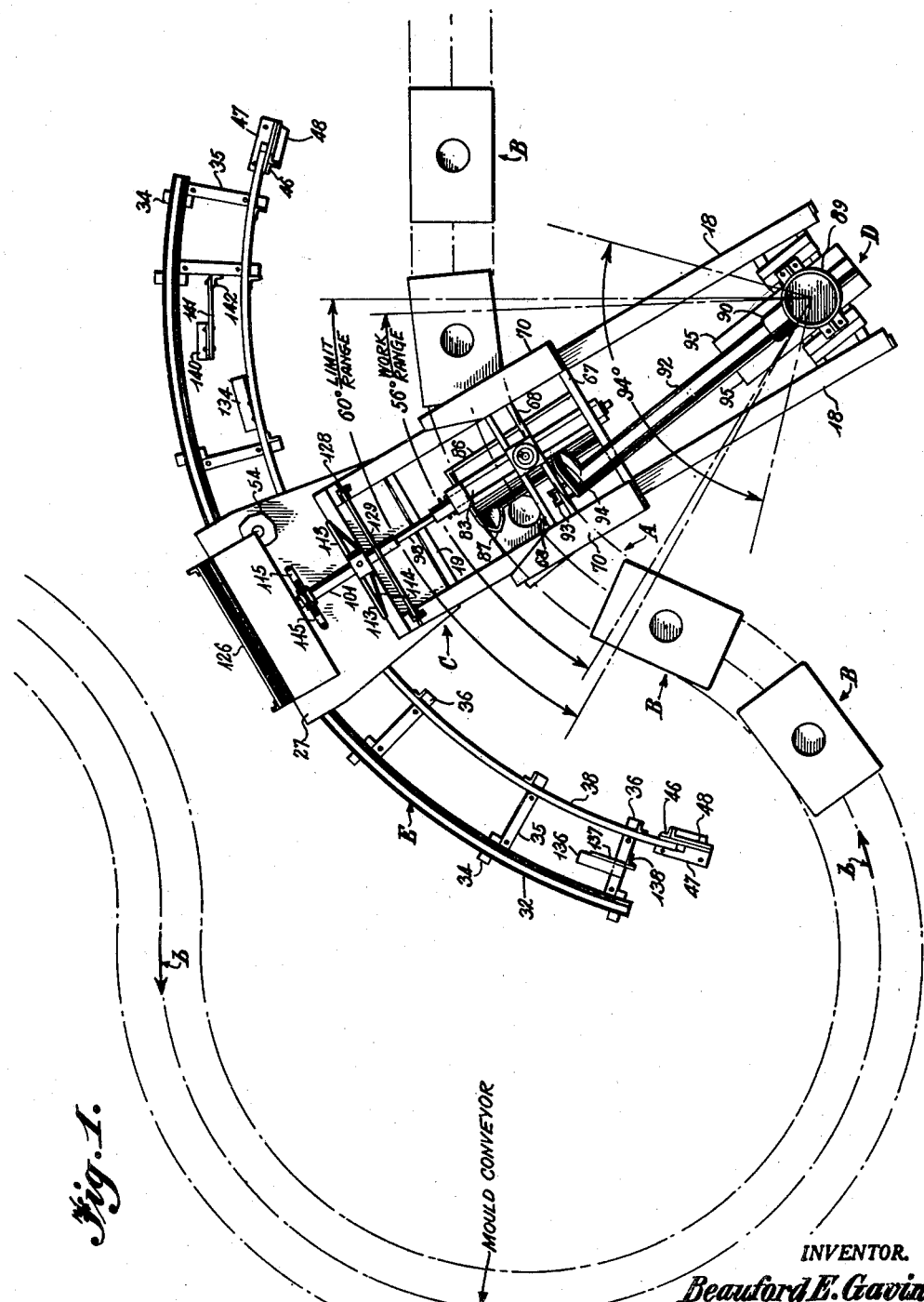

INVENTOR.
Beauford E. Gavin, Sr.
ATTORNEY

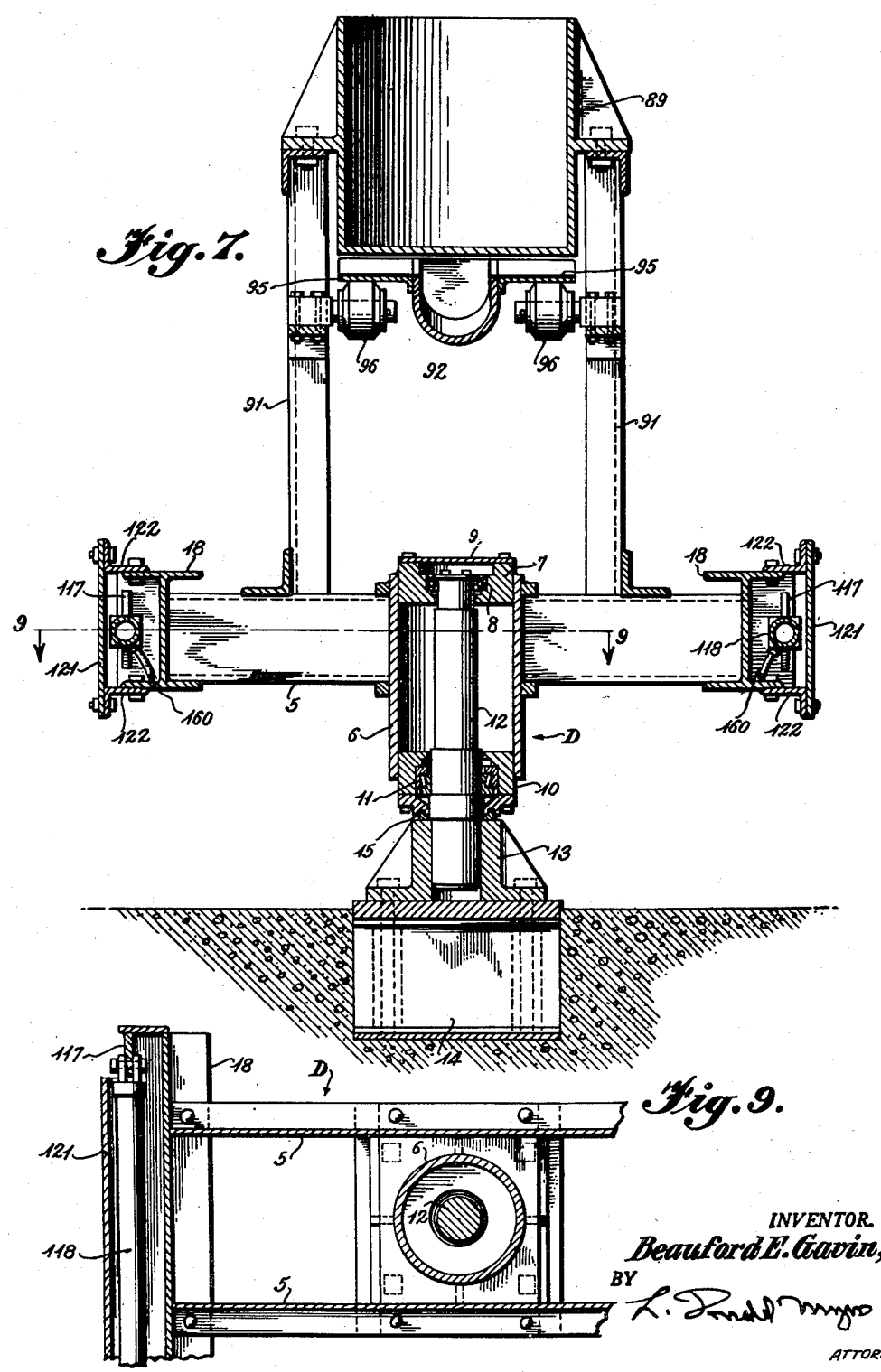

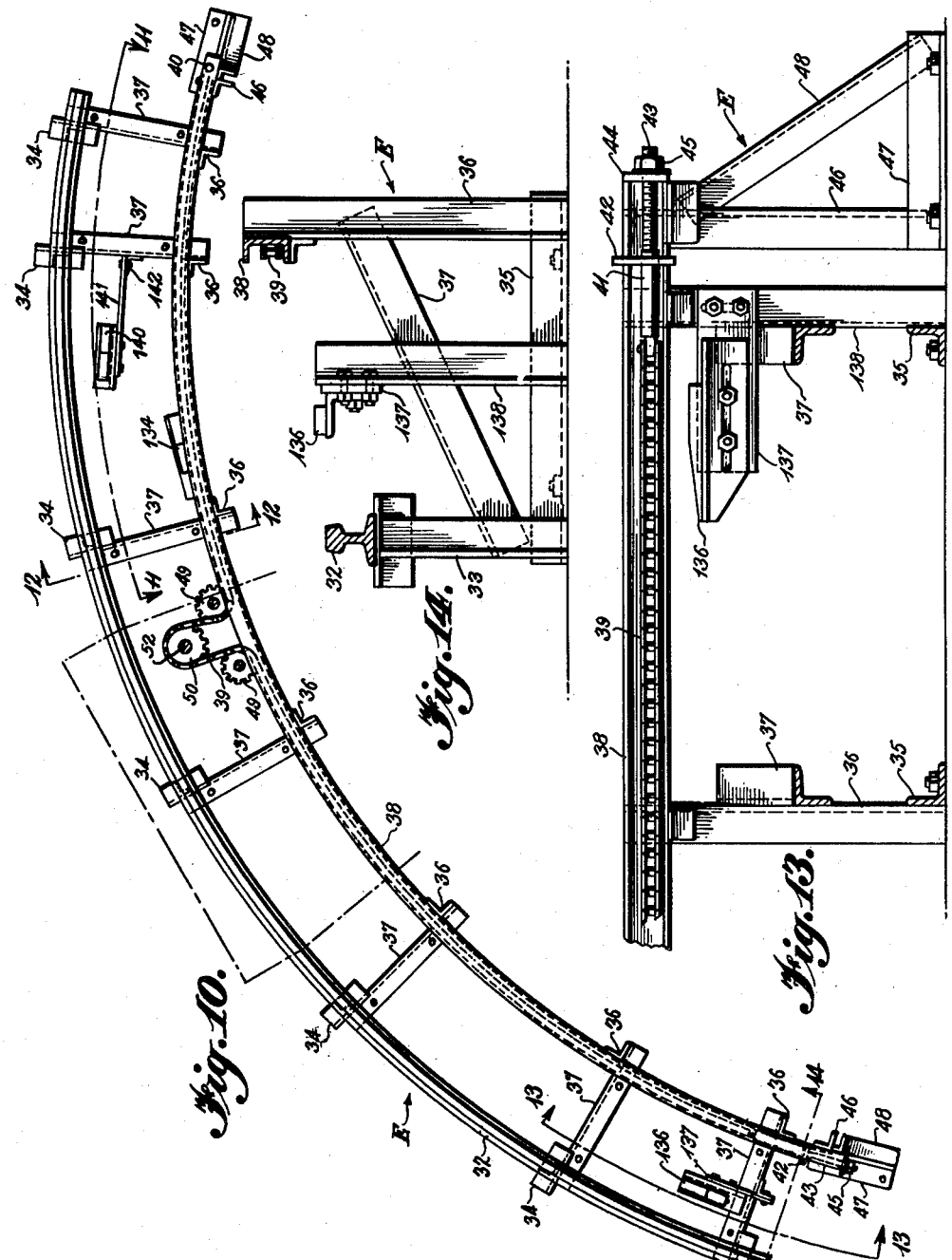

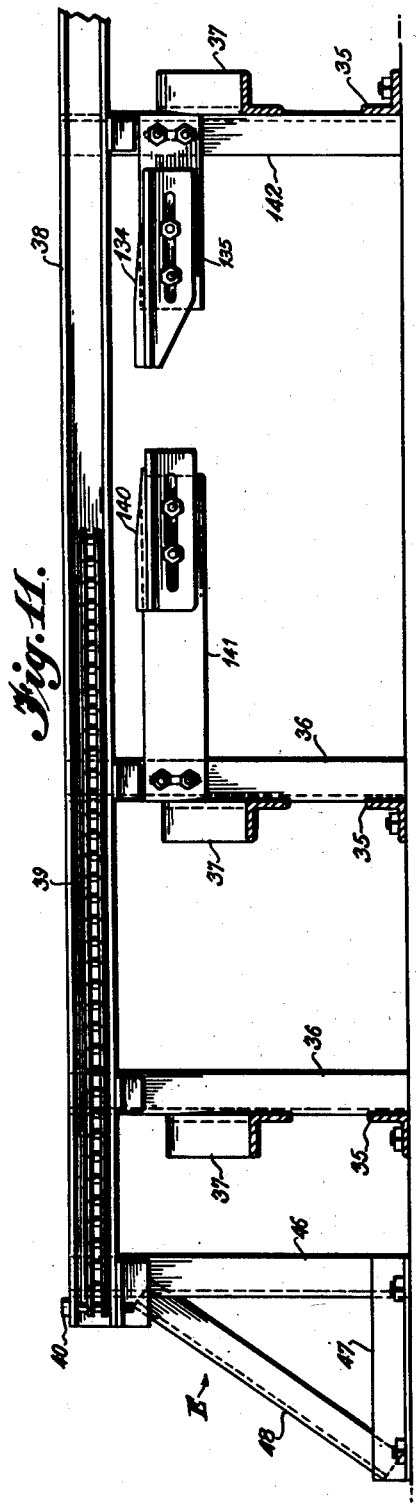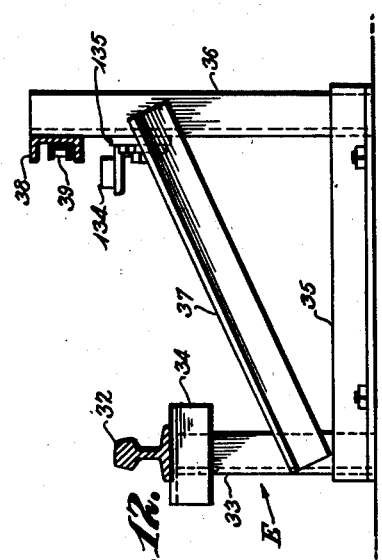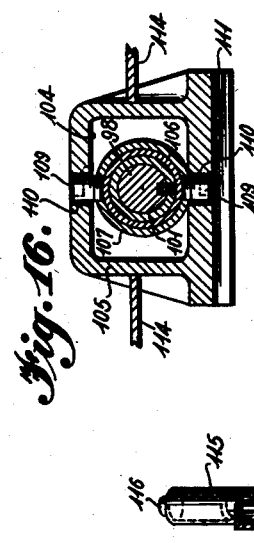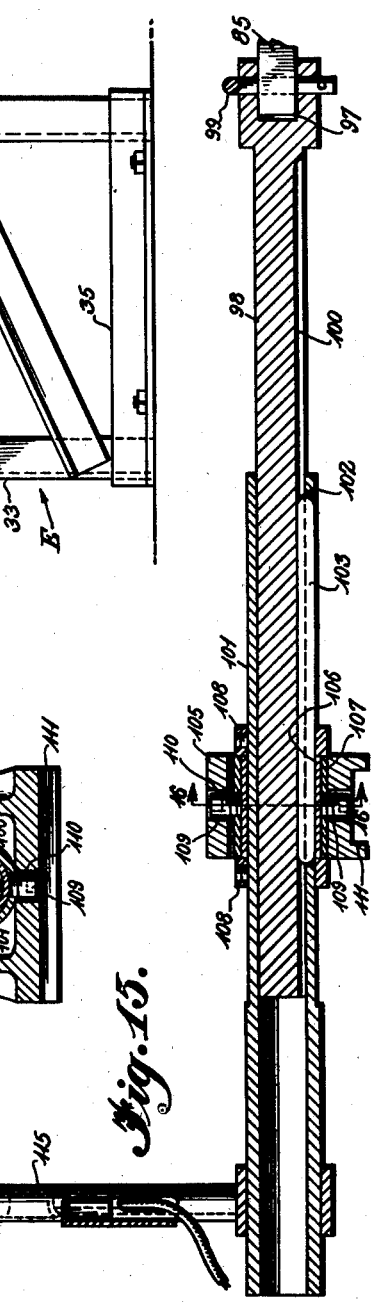

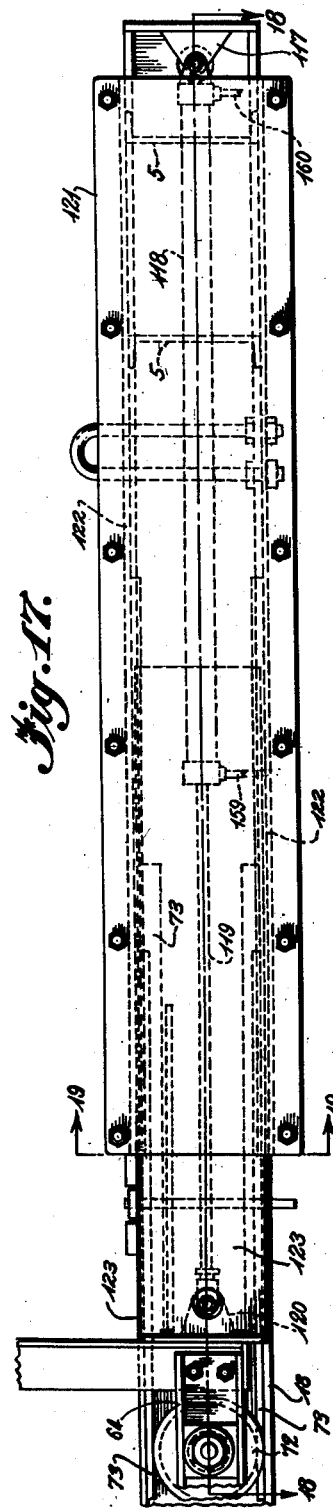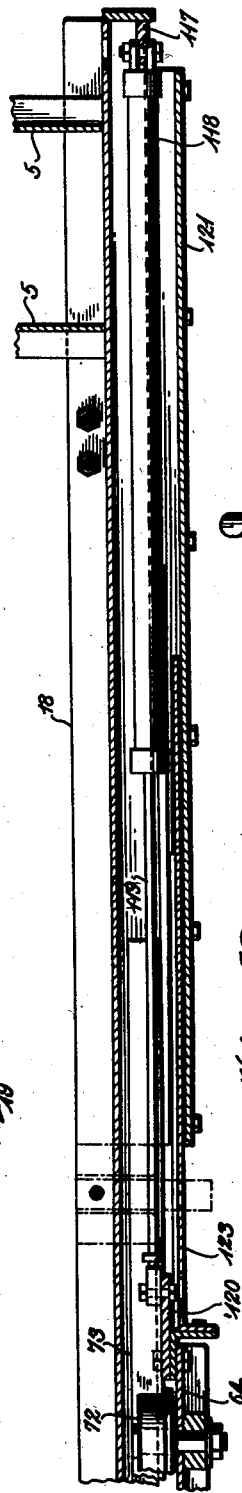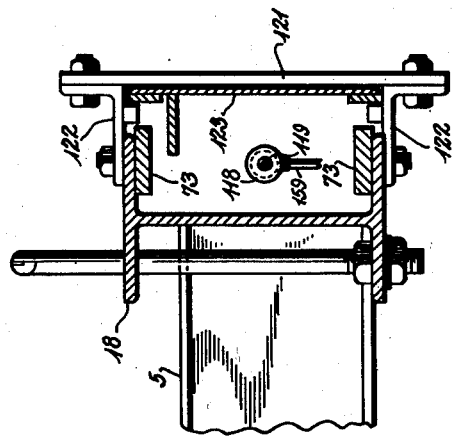

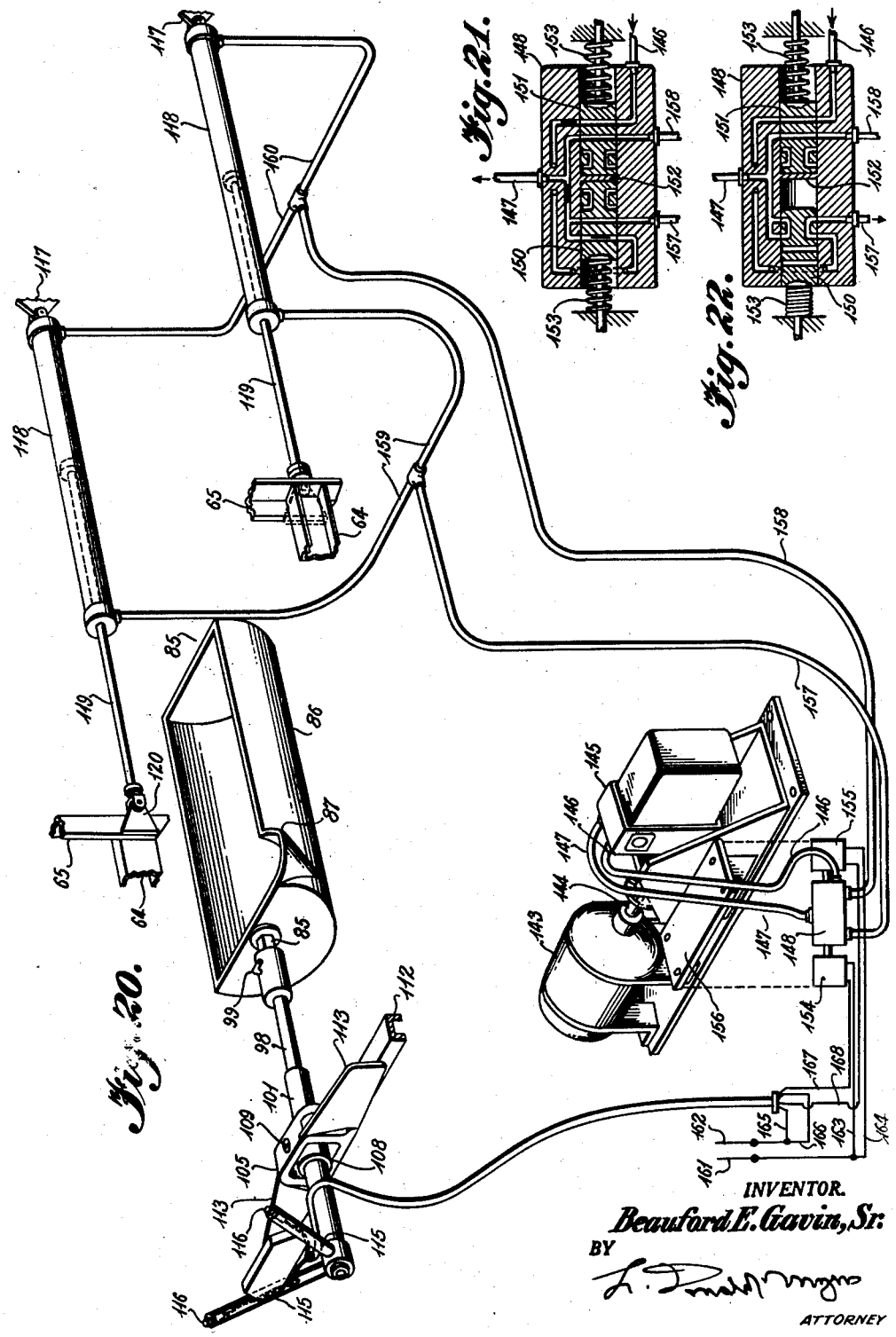

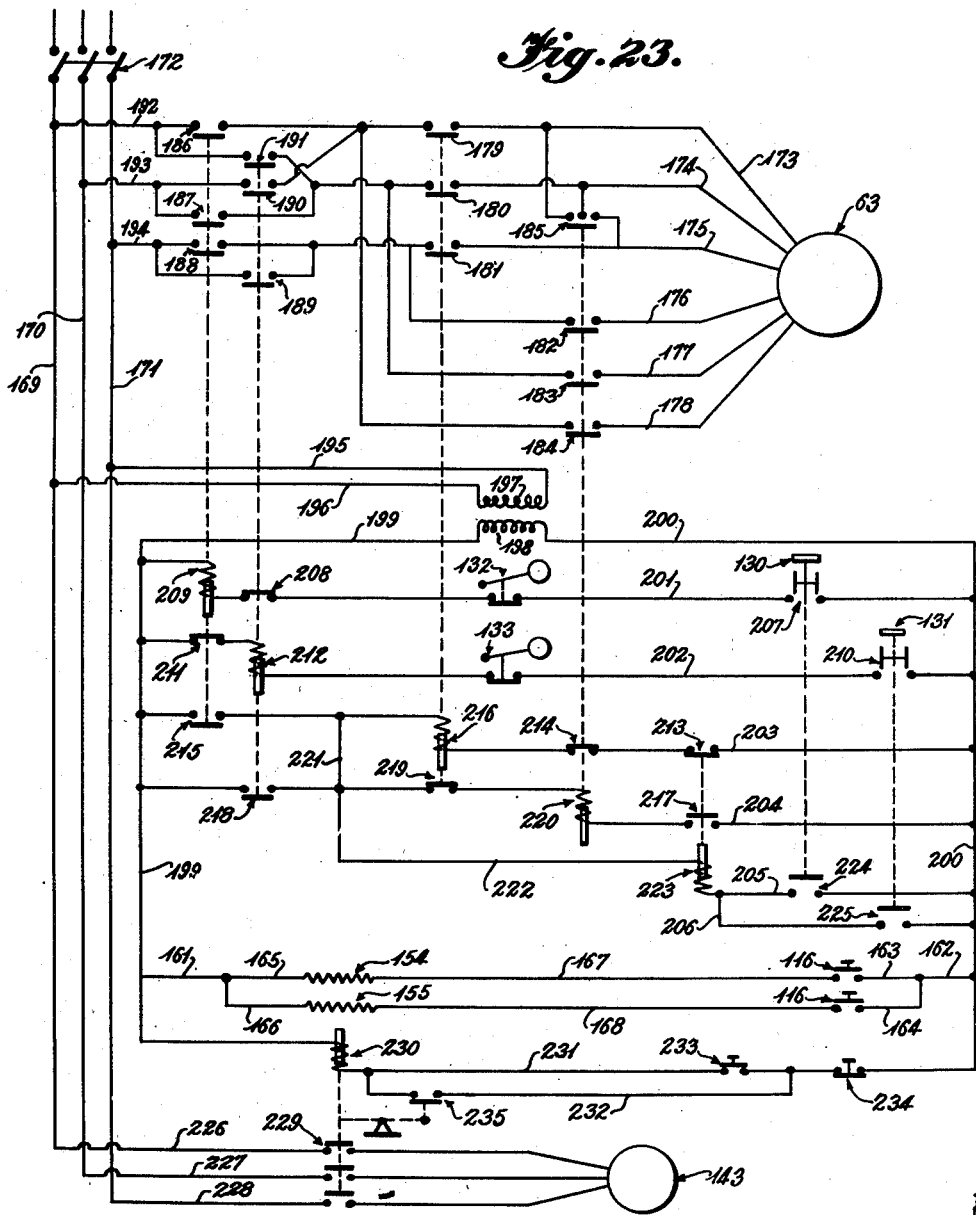

Patented Sept. 12, 1950

2,522,031

UNITED STATES PATENT OFFICE 2,522,031

CONTINUOUS POURING MACHINE FOR TRAVELING MOLD CONVEYERS

Beauford E. Gavin, Sr., Indianapolis, Ind., assignor to National Malleable and Steel Castings Company, Cleveland, Ohio, a corporation of Ohio Application February 25, 1949, Serial No. 78,325

9 Claims. (Cl. 22—79)

This invention relates to new and useful improvements in continuous pouring machines for traveling mold conveyors.

In pouring molds that are carried by a continuously traveling endless conveyor, it is the present practice in modern foundries to provide an overhead monorail from which the pouring ladles are suspended. This monorail system is so arranged that it will support the ladles while they are being pushed back and forth by the casters between the molten metal furnace and the pouring station of the mold conveyor and, also, while the molten metal is being poured from the ladles into the moving molds.

It further is common practice to provide the mold conveyor, at its pouring station, with a platform having a traveling tread that is driven at the same speed as the trays or cars of the conveyor. This traveling tread provides a moving support on which the casters stand while they are pouring molds.

When a continuous traveling mold conveyor is used, it will be appreciated that a sufficient number of casters must be employed to accomplish pouring of all of the molds as they pass through the pouring station. When it is considered that each cycle of operation for a caster involves a round trip between the furnace and the pouring station and quite often a wait for his turn at the cupola, it will be appreciated that a substantial number of casters must be employed during each working shift.

It is the primary object of this invention to provide a power driven, continuous pouring machine, under the control of a single operator, that has the capacity to pour all of the molds on a traveling conveyor that are customarily handled by the several casters employed at a conventional pouring station.

Another important object of the invention is the provision of a pouring machine of the abovementioned type that is capable of handling molds of different heights, lengths and capacities, and with their sprue holes placed at different locations.

A still further object of the invention is to provide a power driven pouring machine that travels at the same speed as the mold conveyor during the pouring of a mold and that travels at a substantially higher speed during its movement in the reverse direction, between pouring operations, for registering with the mold that is carried by the next succeeding conveyor tray or car.

Still another object of the invention is to provide a continuous pouring machine that is adapted for pouring molds while they are traveling along an arcuate bend in the path of a mold conveyor, said machine including a main frame or bridge that straddles the conveyor path and has its inner end supported for pivotal movement about an axis that coincides with the center of the aforesaid arcuate bend in the conveyor path, and that has its outer end supported for forward and reverse travel along a curved path that is concentric with the bend of the conveyor path.

A further object of the invention is the provision of a continuous pouring machine that comprises a pivoted main frame or bridge having an operator's platform at its outer end portion and a pouring ladle supporting carriage movable lengthwise of its inner end portion with hydraulic means, controlled from the platform, for effecting the desired movements of said carriage.

A still further important object of the invention is to provide a continuous pouring machine for use with a continuously traveling mold conveyor, said pouring machine comprising a main frame or bridge adapted to travel, under the control of an operator, at different speeds and in opposite directions relative to a portion of the path of the mold conveyor, and a pouring ladle, under the control of the same operator, supported on and movable independently of said main frame or bridge, said movements of the pouring ladle being in directions transversely of and longitudinally of the path of the mold conveyor to allow the spout of the pouring ladle to be spotted with reference to the sprue holes of successive molds.

Another object of the invention is the provision of a pouring machine for a continuously traveling mold conveyor, said machine including a main frame or bridge adapted to partake of forward and reverse movements along the path of the mold conveyor, a pouring ladle mounted on the main frame or bridge for movement therewith and for movements independently thereof in directions that are transverse of and lengthwise of the conveyor path, and trough means for continuously supplying the ladle with molten metal from a furnace.

Other objects and advantages of the invention will be apparent during the course of the following description.

Figure 2:
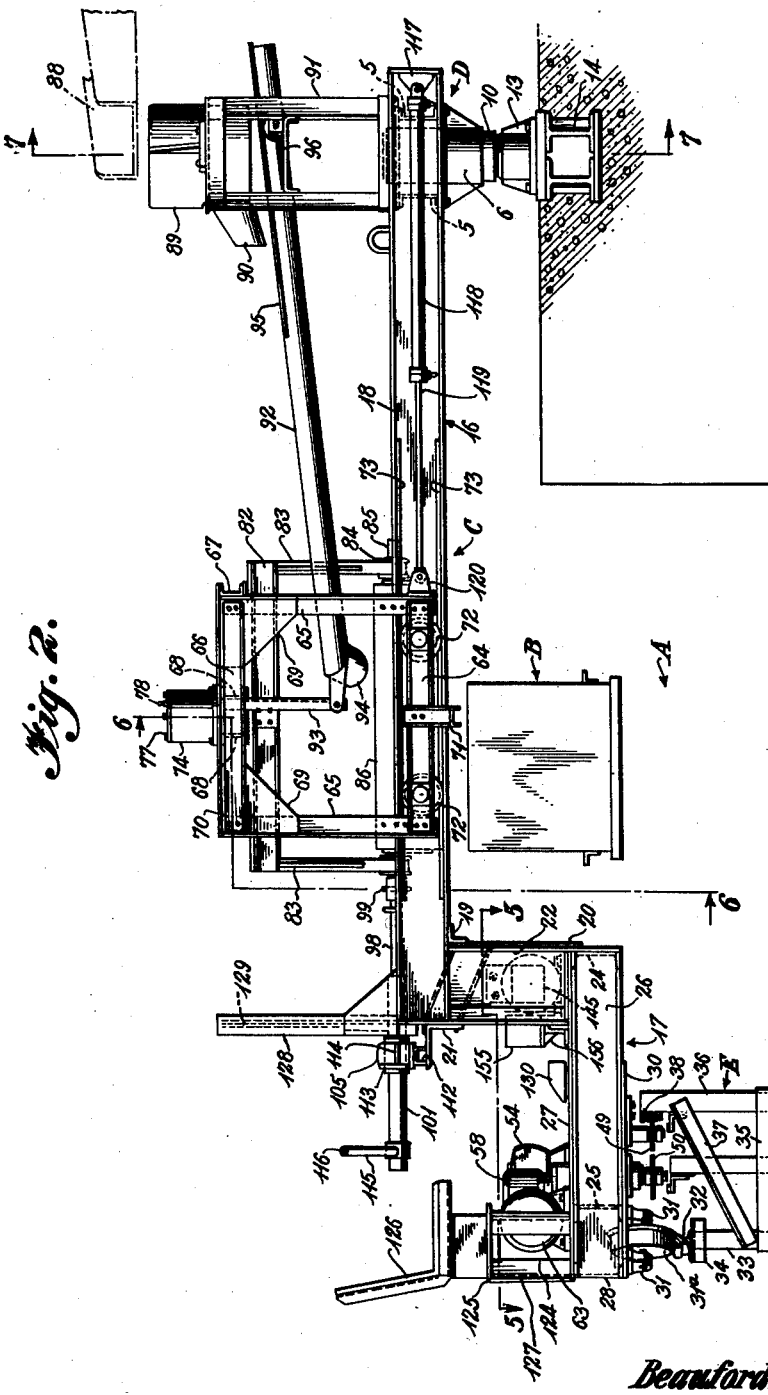
Figure 3:
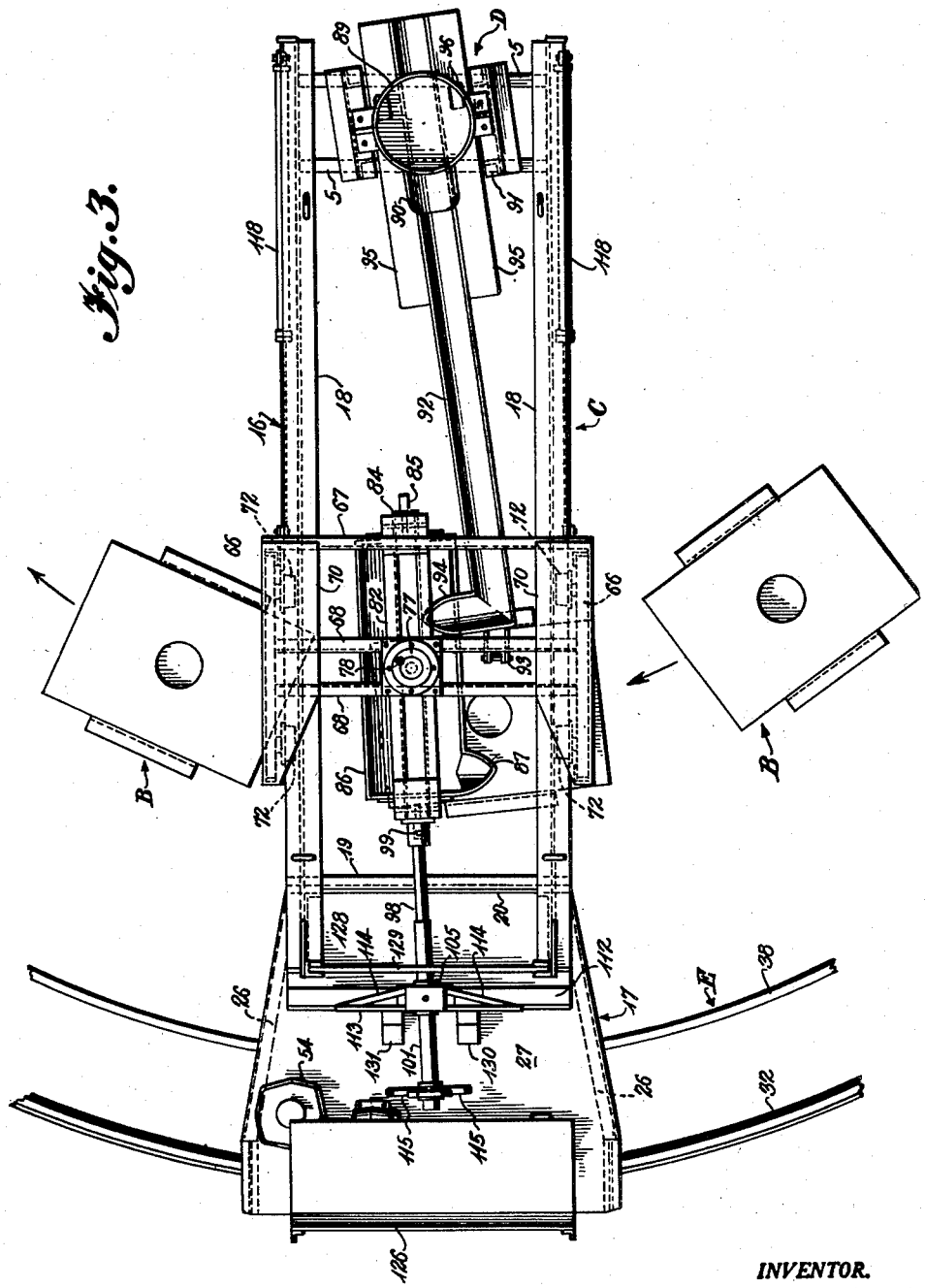
Figure 4:
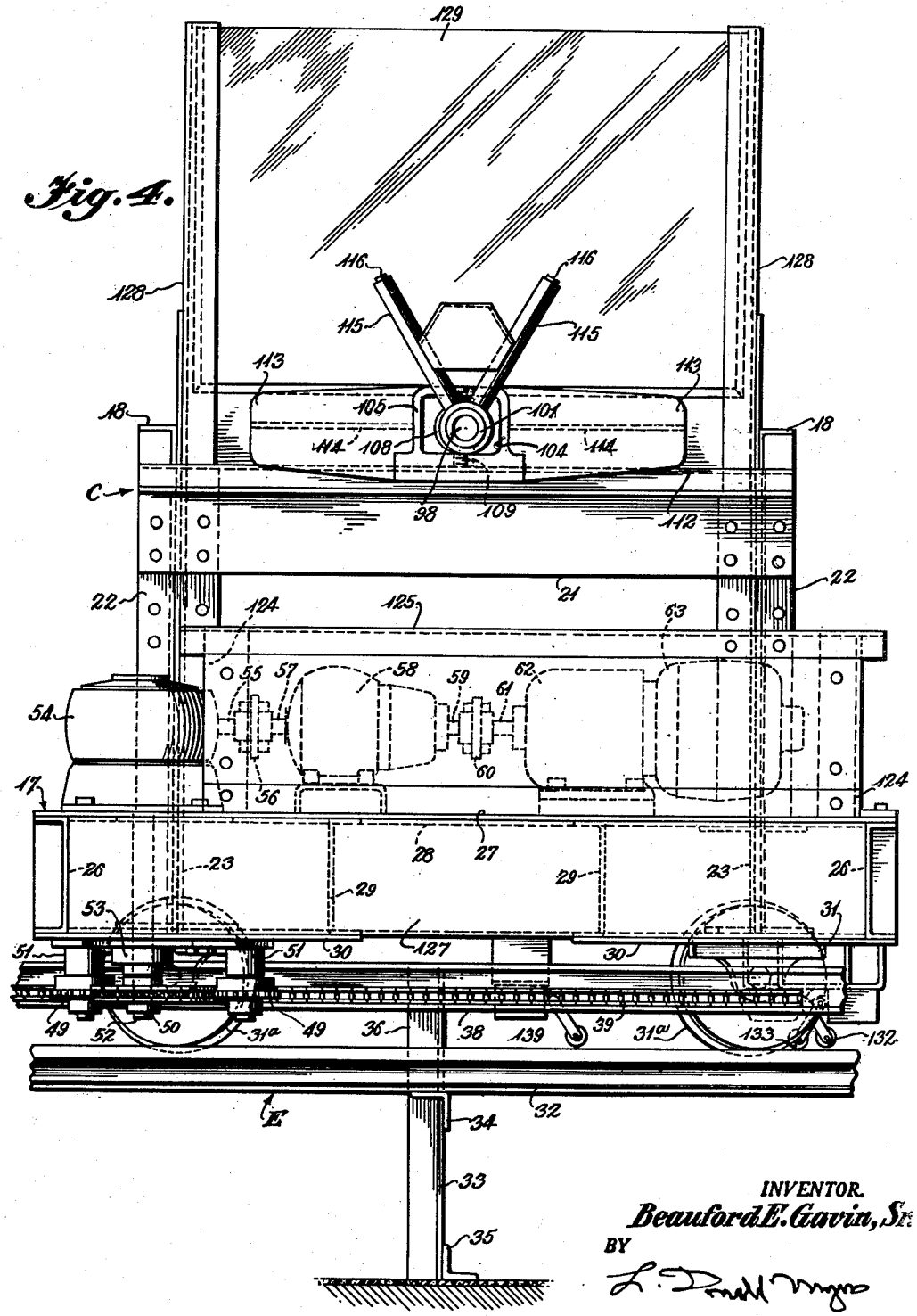
Figure 5:
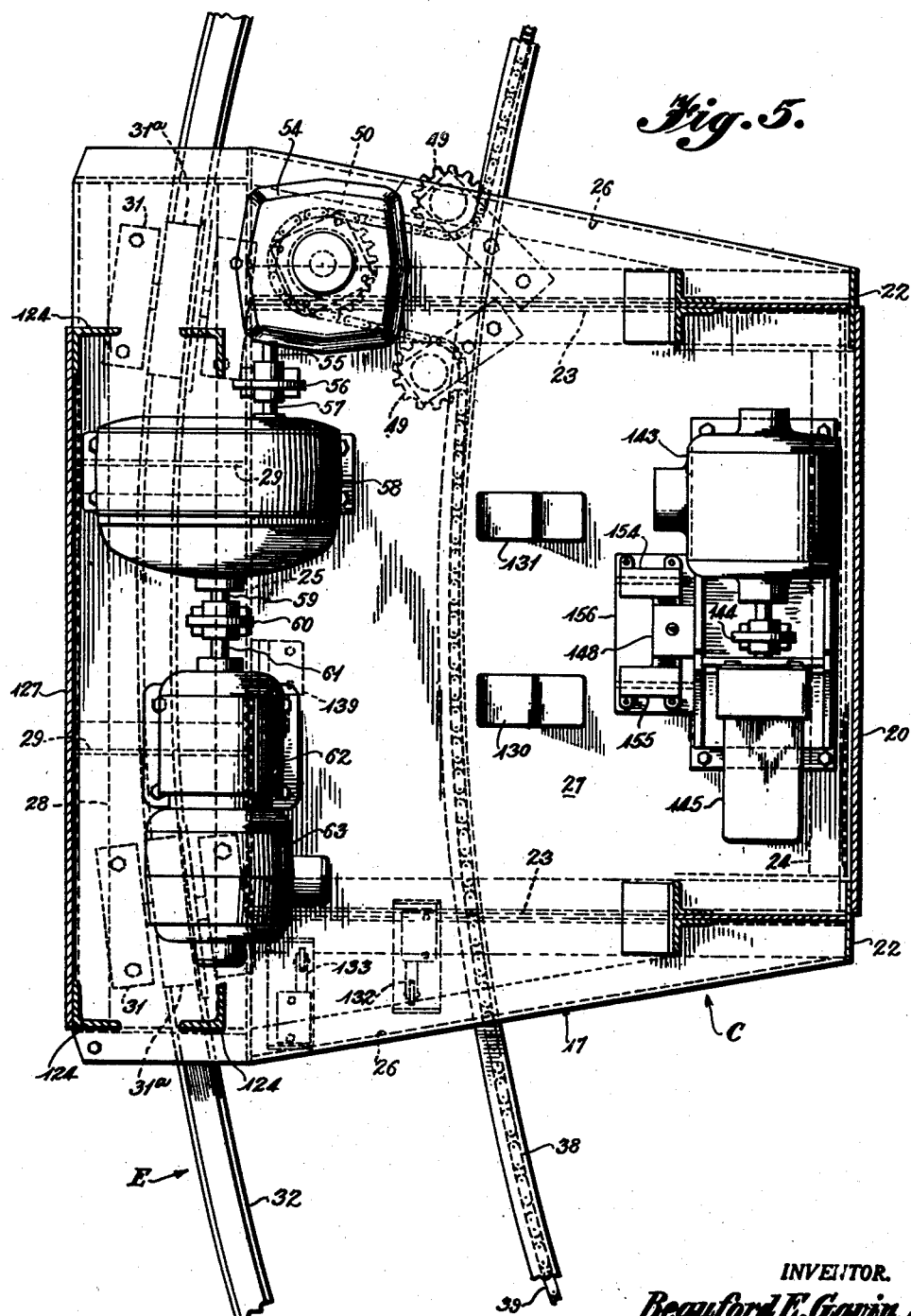
Figure 6:
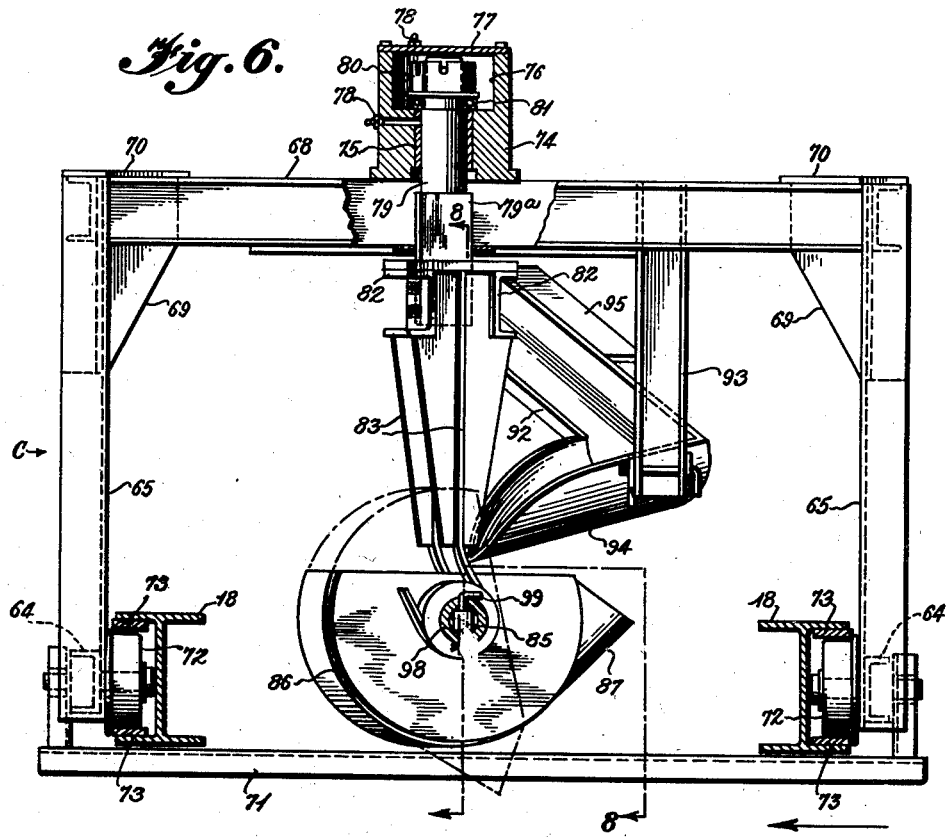
Figure 8:
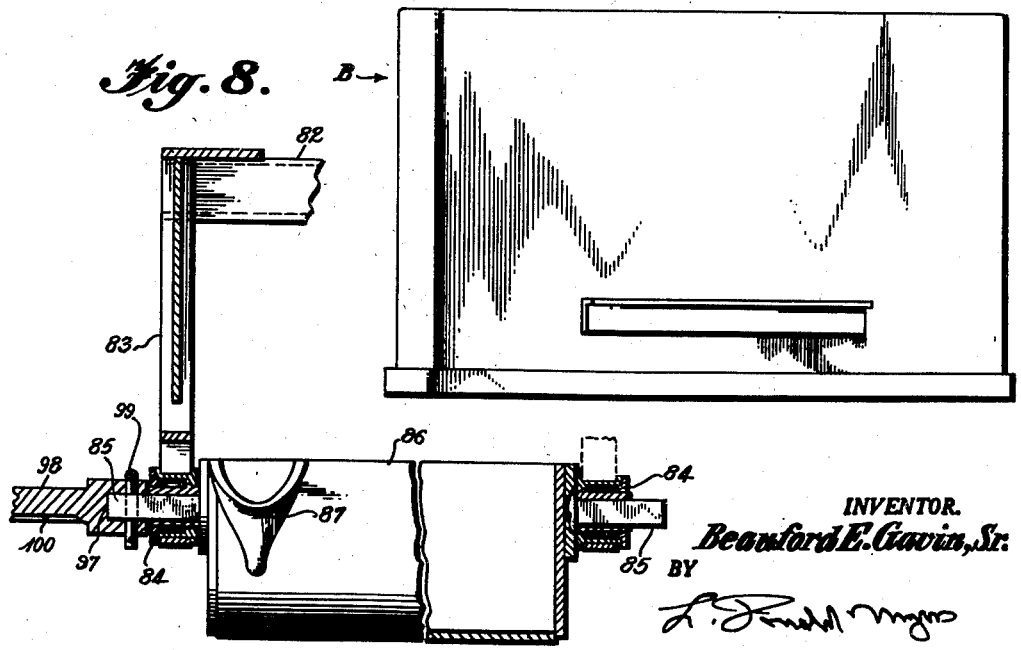

In the accompanying drawings forming a part of this specification and in which like numerals are employed to designate like parts throughout the same, Figure 1 is a plan view of the continuous pouring machine embodying this invention illustrated as being operatively associated with a curved portion or arcuate bend formed in the path of travel of a mold conveyor, Figure 2 is a side elevational view of the mold pouring machine illustrated in Fig. 1, Figure 3 is an enlarged, top plan view of the said pouring machine, Figure 4 is an outer end elevational view of the pouring machine, Figure 5 is a fragmentary, horizontal sectional view taken on line 5—5 of Fig. 2, Figure 6 is a vertical sectional view taken on line 6—6 of Fig. 2, Figure 7 is a vertical sectional view taken on line 7—7 of Fig. 2, Figure 8 is a detail vertical sectional view taken on line 8—8 of Fig. 6, Figure 9 is a detail horizontal sectional view taken on line 9—9 of Fig. 7, Figure 10 is a detail plan view of the arcuate base that supports the outer end portion of the traveling, pouring machine main frame, Figure 11 is a fragmentary vertical sectional view taken on line 11—11 of Fig. 10, Figure 12 is a detail vertical sectional view taken on line 12—12 of Fig. 10, Figure 13 is a fragmentary longitudinal sectional view taken on line 13—13 of Fig. 10, Figure 14 is a detail vertical sectional view taken on line 14—14 of Fig. 10, Figure 15 is a detail longitudinal sectional view of a pouring ladle control shaft that is further illustrated in Figs. 1 to 3, inclusive, Figure 16 is a detail transverse sectional view taken on line 16—16 of Fig. 15, Figure 17 is a fragmentary, side elevational view disclosing a hydraulic cylinder and piston unit that is employed for moving a pouring ladle supporting carriage longitudinally of the main frame of the pouring machine, Figure 18 is a longitudinal sectional view taken on line 18—18 of Fig. 17, Figure 19 is a transverse sectional view taken on line 19—19 of Fig. 17, Figure 20 is a schematic view illustrating the hydraulic system that is employed for moving the pouring ladle supporting carriage longitudinally of the pouring machine main frame, Figures 21 and 22 are detail sectional views illustrating two positions of a double solenoid operated control valve for the hydraulic system of Fig. 20, Figure 23 is a wiring diagram of the pouring machine driving motor and its controls, and Figure 24 is a wiring diagram of the mold conveyor driving motor and its controls.

In the drawings, wherein for the purpose of illustration is shown the preferred embodiment of this invention, and first particularly referring to Fig. 1, the reference character A designates the arcuate or curved portion of the mold conveyor path through which the conveyor cars and their unpoured molds B travel, in the direction of the arrow lines $b$, while being served by the pouring machine designated in its entirety by the reference character C. The pouring machine includes a main frame pivotally supported at its inner end D for movement about a vertical axis that coincides with the center of the arcuate or curved portion A of the mold conveyor path. The outer end portion of the main frame of the pouring machine is supported for travel in opposite directions along the arcuate or curved base E. This base is concentric with the arcuate or curved portion A of the mold conveyor path and consequently has as its center the vertical axis about which the inner end D of the pouring machine frame pivots.

The machine is intended to pour molds while traveling in the same direction as, and at the same speed as, the mold cars and their unpoured molds B. After a mold is poured, the main frame of the pouring machine moves in the reverse direction, or counter-clockwise as viewed in Fig. 1, at a sufficiently higher speed than the speed of travel of the mold conveyor cars or trays to enable the pouring machine to be properly associated with the next succeeding or following mold so that that mold can be poured before it moves out of the working range of the pouring machine. It will be noted from the disclosure of Fig. 1 that the working range of the pouring machine involves an arc of 56° while the maximum or extreme limits of the range of movement of the pouring machine covers an arm of 60°.

Referring now to Figs. 2, 7 and 9, it will be seen that the pivoted inner end D of the pouring machine main frame consists of two parallel, transversely arranged channel members 5 which are suitably connected to a perpendicular pivot column body 6 located between the two channel members. The upper end of this body has suitably mounted therein the upper bearing holder 7 which is of annular formation to receive a suitable antifriction bearing 8. A cover 9 is removably fastened to the upper face of the holder 7 to form a lubricant receptacle for the bearing 8.

The lower portion of the pivot column body 6 has suitably mounted therein the lower bearing holder 10 which is of annular formation to accommodate a suitable antifriction bearing 11 in its bore.

A pivot column shaft 12 is journaled in the bearings 8 and 11 and depends below the lower bearing holder 10 for entry into the base 13 suitably fastened to the subbase 14 embedded in the floor of the foundry in which the pouring machine is installed. It will be appreciated that the lower end portion of the pivot column shaft 12 is suitably anchored in the bore of the base 13 to prevent rotation of the shaft. A suitable labyrinth seal 15 is provided between the lower bearing holder 10 and the stationary base 13.

The main frame of the pouring machine C includes a track portion 16 and an operator's platform portion 17. By considering Fig. 2, it will be seen that the track portion 16 and the operator's platform portion 17 are both horizontally arranged but with the platform portion at a lower level. Collectively, these two main frame portions straddle the molds B as they travel along the curved or arcuate portion A of the mold conveyor path.

By considering Figs. 1, 2, 3, 6, 7, 9 and 17 to 19, inclusive, it will be seen that the track portion 16 of the main frame consists of two laterally spaced, parallel I-beams 18 which are connected to the two transverse channel members 5 at the pivoted end D of the pouring machine frame. The outer end portions of the two I-beams 18 are transversely braced and connected by the angle iron 19, see Figs. 2 and 3, the depending, transverse shield plate 20 and the transversely extending angle member or shelf 21.

Figs. 2, 4 and 5 disclose two I-beam frame members 22 as depending from the outer end portions of the I-beams 18 for connecting the outer end of the track portion 16 of the main machine frame to the inner end of the platform portion 17 of said frame.

This platform portion 17 is illustrated in Figs. 2, 4 and 5 as being formed of parallel, fabricated beams 23 which are transversely braced and connected by channel members 24 and 25. Figs. 4 and 5 disclose additional platform frame members in the form of side channels 26 which are angularly shaped to provide a flare or increase in width for the outer portion of the platform. A floor plate 27 rests upon the top flanges of the frame members 23 to 26, inclusive, and is suitably fastened thereto.

The outer extremities of the side frame members 26 are illustrated in Figs. 2, 4 and 5 as being interconnected by a transverse channel member 28 which, also, provides support for the outer edge of the floor plate 27. Figs. 4 and 5 show two additional platform frame members 29 which interconnect the transverse channel frame members 25 and 28 intermediate their ends.

These last-mentioned frame members 29 function to brace and support the two mounting plates 30 which underlie and are parallel with the floor plate 27. These mounting plates 30 are additionally suitably fastened to the transverse platform frame members 25 and 28 and to the outer end portions of the side frame members 26. One function performed by the mounting plates 30 is to carry the pillow blocks 31 in which the shafts of the frame supporting wheels 31a are journaled.

The supporting wheels 31a for the pouring machine frame are adapted to travel along the rail 32 that is arcuately curved and forms a part of the base E disclosed in detail in Figs. 10 to 14, inclusive, and generally in Figs. 1 to 5, inclusive. The curved rail 32 is supported by a series of vertical angle members 33 each one of which is provided with a transverse angle plate 34 at its upper end to which the rail 32 is directly attached. The lower ends of the upstanding angle members 33 are connected to the horizontal mounting angles 35 which are properly anchored to the floor of the foundry.

Additional perpendicularly arranged angle members 36 are provided and are positioned in parallelism with the angle members 33. The members 36, also, are suitably attached at their lower ends to the mounting angles 35. Angularly arranged braces 37 are attached at their opposite ends to the perpendicular angle members 33 and 36 to interconnect and brace these members.

The upper ends of the perpendicular angles 36 are all interconnected by the curved channel member 38. Figs. 5, 10, 11 and 13 best illustrate this curved channel member 38 as functioning to guide and support the length of conventional roller chain 39 which is fixedly anchored at one end by the pin 40, that passes vertically through the top and the bottom flanges of the channel member 38, and is adjustably anchored at its other end by means of the take-up screw 41. This screw is illustrated in Fig. 13 as slidably passing through a vertical guide plate 42, intermediate its ends, and as having its threaded end 43 passing through a second vertical plate 44 against the outer face of which the adjusting nut 45 bears.

To properly support each end portion of the arcuate channel member 38 against the pull that will be applied thereto by the roller chain 39, perpendicularly arranged angle members 46 are provided and are connected at their upper ends to the extremities of the channel member 38. The lower ends of these angle members 46 are properly attached to the mounting angles 47 that are anchored to the floor of the foundry. Angularly arranged braces 48 are suitably attached at their upper ends to the perpendicular angle members 46 and at their lower ends to the mounting angles 47.

The roller chain 39 is illustrated in Figs. 4, 5 and 10 as being employed for providing driving traction for the pouring machine frame in its travel in opposite directions along the curved base E. That is to say, the roller chain 39 is looped or trained around the two idler sprockets 49 and the drive sprocket 50. The two idler sprockets 49 are suitably supported by brackets 51 attached to one of the mounting plates 30.

The drive sprocket 50 is keyed, or otherwise suitably attached, to the shaft 52 supported by the bearing 53 attached to the last-mentioned mounting plate 30. The drive sprocket shaft 52 is the output shaft of a conventional worm reduction gear unit 54 that is mounted on the floor plate 27 of the operator's platform 17.

The input shaft 55 of the worm reducer 54 is connected by a suitable coupling 56 to the output shaft 57 of a suitable variable speed transmission unit 58. This variable speed transmission unit may take the form disclosed in the Henry G. Keller patent, No. 2,329,911, issued September 21, 1943.

The input shaft 59 of the transmission unit 58 is connected by a suitable coupling 60 to the output shaft 61 of a traction type fluid coupling unit 62. This fluid coupling may take the form disclosed in the R. M. Schaefer patent, No. 2,240,270, issued April 29, 1941. The fluid coupling is directly connected to the armature shaft of a standard, multiple-speed, reversible electric motor 63.

The various units 54, 58, 62 and 63 of the drive mechanism for the pouring machine frame are properly mounted on and fastened to the outer portion of the floor plate 27. This drive mechanism will operate to cause the pouring machine to travel or swing in opposite directions due to the reversible character of the electric motor 63. It is necessary that the electric motor be capable of operating at at least two speeds in each of its two directions of rotation. The low speed should be approximately 450 revolutions per minute. The top speed should be at least 1800 revolutions per minute. Transmission of the drive through the traction type fluid coupling 62 assures smooth, easy starting for both directions of rotation of the electric motor.

When the pouring machine frame is traveling in the same direction as the moving mold conveyor and a mold is being poured, it is very essential that the pouring machine frame travels at exactly the same speed as the mold. This synchronizing of the two speeds is accomplished by having the lower speed of the electric motor 63 correspond approximately with the desired speed, due consideration being given to the speed reduction provided by the reducer unit 54, and by compensating for any variation by adjusting the variable speed transmission unit 58. This transmission unit is of the infinitely variable type and can be adjusted to effect very small increments of speed changes.

It will be appreciated that after a mold has been poured, it is necessary for the pouring machine frame to travel in the reverse direction and at a high enough speed to pick up the next succeeding mold so that it in turn can be poured before moving out of the work range of the pouring machine, as shown on Fig. 1. This operation is repeated for each mold that is to be poured while it travels through the arcuate or curved portion A of the mold conveyor path.

The track portion 16 of the pouring machine main frame is illustrated in Figs. 1, 2, 3 and 6 as having a ladle supporting carriage mounted thereon for longitudinal travel in opposite directions. The ladle carriage is a fabricated frame-like structure that includes the two longitudinal base rails 64 having connected to their end portions the four angle uprights 65 that are joined at their upper ends by the two longitudinal or side channel members 66 and the single transverse channel member 67 that is arranged at the inner end of the carriage.

The above referred to figures also disclose two transversely extending, intermediate channel members 68 that are suitably joined at their extremities to the inner sides of the longitudinal or side channel members 66. Suitable corner gusset plates 69 are provided to reinforce the four upper corners of the ladle carriage frame while reinforcing top plates 70 are also included.

To prevent lateral spreading of the opposite sides of the carriage frame, a stirrup 71 is provided. This stirrup includes vertical end portions suitably attached to the intermediate portions of the base rails 64 and a transversely extending bottom portion that underlies the track portion 16 of the pouring machine main frame.

The ladle carriage is supported on the I-beams 18 by means of the four wheels 72 suitably mounted on the base rails 64. The outside flanges of the longitudinal I-beams 18 are provided with strengthening and wear resisting tread strips 73 that cooperate with the carriage supporting wheels 72.

The intermediate, transverse frame members 68 of the ladle carriage are employed for mounting the ladle pivot body 74 having a bore portion for the reception of a bronze bushing, or other type of bearing, 75. The upper end portion of the pivot body 74 is properly formed to provide the chamber 76 that is closed at its upper end by the detachable cover 77. Suitable lubricant fittings are associated with the pivot body 74 and its top cover 77 to provide lubrication for the ladle pivot shaft 79 that is journaled in the bronze bushing 75. A retaining nut 80 is threaded on the upper end portion of the pivot shaft 79 that projects into the chamber 76. A thrust bearing 81 vertically supports the pivot shaft 79 through the medium of its retaining nut 80.

The lower end portion 79a of the ladle pivot shaft 79 is of square formation in cross-section for having bolted thereto the parallel channels 82 that extend horizontally and generally longitudinally of the ladle carriage. It will be understood that the ladle support that is formed by the two channel members 82 can be swung or pivoted about the vertical axis of the ladle pivot shaft 79 as a result of rotary movement of this shaft in its bearing 75.

The opposite ends of this pivotal ladle support has suitably fastened thereto the two ladle yokes 83 which are hook-shaped at their lower ends to support the ladle bearings 84, see Figs. 6 and 8. The bearings 84 rotatably support the trunnions 85 that are suitably fastened to the opposite ends of the ladle 86 which has a laterally projected pouring spout 87.

From the mounting structure just described, it will be seen that the ladle 86 can be rocked or pivoted about the alined axes of its trunnions 85 for pouring molten metal from the spout 87. The ladle 86, also, can be swung about the vertical axis of the pivot shaft 79 to assist in vertically alining the pouring spout 87 with the sprue holes of the molds that are successively moved past the pouring machine location by the endless mold conveyor.

The ladle 86 receives its supply of molten metal from a suitable furnace or cupola, not shown, having a discharge spout or trough 88, partially disclosed in broken lines in Fig. 2. The molten metal runs into a receiver 89 supported by the frame 91 which is best illustrated in Figs. 2 and 7 as being suitably mounted on the two transverse channel members 5 that constitute a part of the pivot end of the pouring machine frame. From the discharge spout 90 of the receiver 89, the molten metal flows into the trough 92 that extends to and is pivotally supported at its outer end by the depending bar 93 attached to the transverse frame members 68 of the ladle carriage. The trough 92 has a discharge spout 94 so positioned that it will always discharge into the ladle 86 regardless of the independent, relative movements of the ladle.

The inner end of the trough 92 is provided with lateral flanges 95 which support the trough on the rolls 96 suitably mounted on the receiver frame 91. It will be appreciated, therefore, that the trough 92 can move with the ladle carriage and relative to the molten metal receiver 89 but the trough will always be positioned to receive the metal from the discharge spout 90 of the receiver.

Figs. 6, 8 and 15 disclose the outer ladle trunnion 85 as projecting into a socket 97 formed on the end of a ladle handle control shaft 98. A pin 99 is employed for maintaining this connection. The shaft 98 has formed therein the longitudinal groove or keyway 100. A ladle handle control tube 101 telescopically receives the control shaft 98 for relative sliding movement. The control tube 101 is formed with a longitudinal slot 102 for receiving the key 103 which also fits in the keyway 100 of the control shaft 98.

The ladle handle control tube 101 is illustrated in Figs. 15 and 16 as passing through the enlarged opening 104 formed in the guide shoe 105. Within the guide shoe, the control tube 101 has fitted thereon the bronze bushing 106 which is positioned within the bearing sleeve 107. The bushing and sleeve are fastened to the control tube 101, against relative axial movement, by the two collars 108. In other words, these collars prevent the control tube 101 from moving axially relative to the bushing 106 and bearing 107.

It is desirable, however, for the control tube 101 and its ladle shaft 98 to be permitted to partake of pivotal movement relative to the guide shoe 105. For that reason, diametrically opposite pivot pins 109 are passed through relatively large openings 110 formed in the top and bottom walls of the guide shoe 105 and are threaded into suitable openings formed in the bearing sleeve 107.

By specifically considering Figs. 2, 3, 4, 15, 16 and 20, it will be seen that the guide shoe 105 is provided with a bottom groove 111 that slidably fits over an inverted channel-shaped guide 112 supported by the shelf or angle member 21 which has been previously referred to. Finishing wing plates 113 are attached to the opposite sides of the guide shoe 105 and are braced or reinforced by the elongated bars 114.

A control handle, having the two divergent grips 115, is fastened to the outer end portion of the ladle handle control tube 101. Each one of these divergent handle grips has a pushbutton switch 116 mounted in its tubular outer end portion.

By utilizing the handle grips 115, the operator of the pouring machine may rock the ladle 86 about the axes of the ladle trunnions 85 and the ladle may also be swung horizontally about the vertical axis of the pivot shaft 79. This leaves for consideration the mechanism that is employed for effecting movement of the ladle carriage longitudinally of the track portion 16 of the pouring machine main frame.

By particularly considering Figs. 2, 3, 7, 9 and 17 to 20, inclusive, it will be seen that each one of the main frame I-beams 18 has an anchor plate 117 fastened to its inner extremity. The closed end of a fluid pressure cylinder 118 is pivotally attached to each anchor plate 117. Each cylinder 118 has a piston rod 119 extending from its free end for pivotal connection with a second anchor plate 120 fastened to the carriage base member 64 that is located on the same side of the track portion 16 of the pouring machine main frame. In other words, the pressure fluid cylinder and piston assemblies 118—119 extend longitudinally of and are positioned between the top and bottom outer flanges of the I-beams 18.

Although they have been omitted from the disclosures of Figs. 2 and 3, stationary cover plates 121 are illustrated in Figs. 7, 9 and 17 to 19, inclusive, as being fastened to the I-beams 18 by the lugs 122. Slide plates 123 are fastened to the ladle carriage to move therewith and fit inside of the stationary cover plates 121.

It will be appreciated that by delivering pressure fluid to the inner or anchored ends of the pressure fluid cylinders 118, their pistons and piston rods will be moved outwardly to cause the ladle carriage to move toward the operator's platform 17 of the pouring machine main frame. By admitting pressure fluid to the remaining ends of the two cylinders 118 the ladle carriage will be caused to travel toward the pivoted end of the pouring machine frame. It will be explained at a later point that the push-button switches 116, which are mounted in the upper extremities of the handle grips 115, are employed for controlling the operations of the pressure fluid piston and cylinder assemblies 118—119 to effect these desired inward and outward movements of the ladle carriage.

By referring to Figs. 2, 4 and 5, it will be seen that a seat supporting frame is formed on the outer portion of the operator's platform by the four corner angle irons 124 which are interconnected at their tops by the plate 125. The seat 126 is suitably supported on this base frame. It will be seen that the seat 126 is conveniently located with reference to the handle on the ladle actuating shaft and that the seat frame partially encloses the pouring machine transmission mechanism that has been previously described. To assist in enclosing this transmission mechanism, a plate 127 is fastened to the outer seat frame angles 124.

Just inwardly of the plane of operation of the guide shoe 105, the operator's platform is provided with an upstanding frame 128 that supports a shatter-proof glass 129. This glass co-operates with the previously referred to shield plate 20 for protecting the operator from the heat of the molten metal and from any splashing that may occur while pouring molds. The window glass 129, however, provides unobstructed vision for an operator occupying the seat 126.

It has been pointed out above that the electric motor 63 provides a reversible drive for causing the pouring machine to traverse its operating range in opposite directions. When the pouring machine is traveling in the same direction as that of the mold conveyor, or in a clockwise direction as viewed in Fig. 1, the pouring machine will be referred to as traveling in a forward direction. The opposite direction of travel of the pouring machine, or in a counter-clockwise direction, will be referred to as the reverse direction.

Figs. 2, 3 and 5 disclose two pedals 130 and 131 which are actuated by the feet of the operator for effecting forward and reverse travel, respectively, of the pouring machine. In other words, when pedal 130 is depressed the pouring machine will travel in the same direction as that of the mold conveyor. When pedal 131 is depressed the pouring machine will travel in the reverse direction.

It will be explained more in detail at a later point, when the wiring diagram of Fig. 23 is described, that each one of the pedals 130 and 131 has two operative positions as a result of being depressed different distances. In the first depressed position, the pouring machine is caused to travel at low speed, or at a speed which approximates that of the mold conveyor. When either of the pedals 130 or 131 is depressed to its lower limit, the pouring machine is caused to travel at high speed.

Because the pouring machine will continue to travel either in a forward or a reverse direction as long as one or the other of the pedals 130 or 131 is held depressed, it becomes necessary to provide some automatic means for stopping the pouring machine when it reaches the opposite limits of the 60° range that is illustrated in Fig. 1. Figs. 4 and 5 disclose two limit switches 132 and 133 which will be automatically actuated to stop the pouring machine at its forward and reverse limits, respectively.

The forward limit switch 132 will be contacted by the stationary cam 134 disclosed in Figs. 1 and 10 to 12, inclusive, as being adjustably mounted on a bracket arm 135 attached at its extremity to one of the base uprights 36. The reverse limit switch 133 is actuated by a cam 136 that is illustrated in Figs. 1, 10, 13 and 14 as being adjustably carried by a bracket arm 137 that has its extremity suitably attached to a special perpendicular angle iron 138 properly attached to the adjacent base frame members 35 and 37.

The forward direction of travel of the pouring machine normally will occur when a mold is being poured and, of course, the mold conveyor will be operating simultaneously to carry the mold through the pouring station. If, for any reason, the forward travel of the pouring machine is automatically stopped at its forward limit, it is very essential that the mold conveyor be stopped at approximately the same time, preferably a little in advance of the stoppage of the pouring machine.

Automatic stoppage of the mold conveyor is accomplished by a limit switch 139 that is disclosed in Figs. 4 and 5 as being suitably mounted on the bottom of the operator's platform of the pouring machine frame. This limit switch is actuated by the stationary cam 140 which is illustrated in Figs. 1, 10 and 11 as being adjustably carried by a bracket arm 141 attached at its extremity to a perpendicular angle member 142 properly supported by adjacent base members 35 and 37.

Figs. 20, 21 and 22 disclose the complete fluid pressure system that is employed for actuating the double-acting cylinder and piston assemblies 118—119 for moving the ladle carriage in opposite directions lengthwise of the track portion 16 of the pouring machine main frame.

The system includes an electric motor 143 connected through the coupling 144 to a commercial form of fluid pump and reservoir unit 145 that operates to constantly deliver pressure fluid to its outlet pipe 146 and to constantly receive the circulated pressure fluid through its return pipe 147 as long as the electric motor 143 is energized. A suitable commercial form of fluid pump unit of this type is manfactured by Vickers Incorporated and is referred to as a hydraulic power pack. Figs. 2 and 5 disclose the electric motor 143 and its fluid pump 145 as being mounted on the floor plate 27 of the operator's platform 17 below and just inwardly of the locations of the two pedals 130 and 131.

The outlet pipe 146 leads to the inlet of a double-solenoid operated four-way valve 148 while the return pipe 147 leads to the outlet of this valve.

By referring to Figs. 21 and 22, it will be seen that the four-way valve 148 includes two reciprocating valve members 150 and 151 which are normally centered in the housing of the valve against the fixed partition 152 by the springs 153. The movable valve member 150 is moved outwardly, against the force of its spring 153, by the solenoid 154. The movable valve member 151 is moved outwardly, against its spring 153, by the solenoid 155. This valve and solenoid assembly is normally mounted on the shelf 156, see Figs. 2, 5 and 20, but is shown removed therefrom in Fig. 20 for convenience of illustration.

The valve 148 has connected thereto two pressure fluid delivery pipe-lines 157 and 158 that extend to and are respectively connected with branch pipe-lines 159 and 160. The two branch pipe-lines 159 are connected to the outer ends of the two cylinders 118. The two branch pipe-lines 160 are connected to the inner ends of these two cylinders. It will be seen, therefore, that when pressure fluid flows from the valve 148 through the pipe-line 157 and the branch pipe-lines 159, the fluid will be delivered to the outer ends of both of the cylinders 118 for effecting movement of their pistons to cause the ladle carriage and its ladle to travel toward the pivoted end of the pouring machine frame. When pressure fluid flows from the valve 148 through the pipe-line 158 and the branch pipe-lines 160, the fluid will be delivered to the inner ends of both cylinders 118 for moving the ladle carriage and its ladle away from the pivoted end of the pouring machine frame.

It will be appreciated that when the pressure fluid is being delivered to one end of each one of the cylinders 118, the pressure fluid must also be discharged or exhausted from the remaining end of each cylinder. Aslo, after the carriage and its ladle have been moved the desired distance in one direction, they should be held in that position by the application of uniform pressure fluid to both ends of both of the cylinders 118.

The solenoid 154 is energized as a result of operation of the push-button switch 116 mounted in the outer end of the right-hand handle grip 115. The solenoid 155 is energized by operation of the push-button switch 116 mounted in the outer end of the left-hand handle grip 115. It will be appreciated, therefore, that when the right-hand push-button switch is actuated, pressure fluid will be delivered to the outer ends of the cylinders 118 to move the carriage and its ladle inwardly toward the pivot end of the pouring machine frame. When the left-hand push-button switch 116 is operated, pressure fluid will be delivered to the inner ends of the cylinders 118 for moving the carriage and its ladle outwardly away from the pivot end of the pouring machine frame.

The push-button switches 116 and their solenoids 154 and 155 are supplied with current through the main lines 161 and 162. Main line 161 is provided with two branch lines 163 and 164 which extend to terminals of the two solenoids 154 and 155, respectively. The main line 162 is provided with branch lines 165 and 166 which extend to the right-hand and left-hand push-button switches 116, respectively. The right-hand push-button switch 116 has a return wire 167 that extends to and is connected with the second terminal of the solenoid 154. The left-hand push-button switch 116 is provided with a return wire 168 that extends to and is connected with the second terminal of the solenoid 155.

By referring to Fig. 21, it will be seen that both of the movable valve bodies 150 and 151 are in their centered positions, bearing against the fixed partition 152, as a result of their actuation by the springs 153. It will be appreciated that both of the solenoids 154 and 155 are deenergized at this time. When both of the movable valve members 150 and 151 are centered, as illustrated in Fig. 21, the pressure fluid outlet pipe 146 and the pressure fluid return pipe 147 are in open communication with both of the delivery pipelines 157 and 158 that lead to the opposite ends of the cylinders 118. Consequently, a uniform fluid pressure is applied to both ends of both cylinders and the carriage with its ladle will remain stationary.

When solenoid 154 is energized, the valve member 150 is moved outwardly, as illustrated in Fig. 22. The remaining valve member 151 continues to occupy its centered position. With valve 148 conditioned in this manner, it will be seen that the pressure fluid flows from the pump 145 through the outlet pipe 146 to the inlet of valve 148. The fluid then flows through the illustrated communicating ducts of the body of valve 148, including one of the straight-through ports in valve member 151 and one of the reversely bent ports in valve member 150. The pressure fluid is thus delivered by pipe-line 157 and branch pipe-lines 159 to the outer ends of both cylinders 118. At the same time pressure fluid is exhausted from the inner ends of the cylinders 118 through the branch pipe-lines 160 and the pipe-line 158 to the body of valve 148. This exhausted pressure fluid will flow through the illustrated communicating ducts formed in the body of the valve, including the second straight-through port formed in the centered valve member 151, to the return pipe 147 for the pump 145.

When the solenoid 155 is energized, as a result of actuation of the left-hand push-button switch 116, valve member 151 is moved outwardly and valve member 150 remains in its centered position. The flow paths illustrated in Fig. 22 are then reversed with reference to these two valve members.

In Fig. 23 there is disclosed a wiring diagram for the pouring machine traverse motor 63 and its controls. The motor is of the alternating current, three-phased, two-speed, reversible type.

The supply of current to the three main power lines 169, 170 and 171 is controlled by the master switch 172. When the traverse motor 63 is connected for low-speed operation in either direction, current is supplied to its windings by the wires 173, 174 and 175. When the motor is connected for high-speed operation in either direction, current is supplied to its windings by the wires 176, 177 and 178. Current flow through the wires 173, 174 and 175 is controlled primarily by the three simultaneously operated switches 179, 180 and 181. Current flow through the wires 176, 177 and 178 is controlled primarily by the simultaneously operated switches 182, 183 and 184. At the same time circuits are established through the wires 176, 177 and 178, the three wires 173, 174 and 175 are shorted or interconnected by the switch 185.

When it is desired to have the pouring machine frame travel in the forward direction, or the same direction as the mold conveyor, the three switches 186, 187 and 188 are closed. It will be understood that this forward direction of travel can be provided for either high-speed or low-speed operation. When the direction of rotation of motor 63 is to be reversed, to provide reverse traverse of the pouring machine frame, switches 189, 190 and 191 are simultaneously closed. It will be appreciated that switches 190 and 191 co-operate with switches 187 and 186 for reversing the polarities of two of the circuit wires that lead to the traverse motor 63.

From the above it will be seen that when the traverse motor 63 is to be operated in a forward direction at low speed, the circuit wire 192 is connected to the motor wire 173 through switches 179 and 186 while circuit wire 193 is connected to the motor wire 174 through switches 180 and 187, and circuit wire 194 is connected to the motor wire 175 through the switches 181 and 188. When this circuit condition exists, the switches 182 to 185, inclusive, 189, 190 and 191 are opened.

When the traverse motor 63 is to be operated at high speed in a forward direction, switches 182 to 185, inclusive, are closed and switches 179 to 181 are opened. Consequently, the circuit wires 192, 193 and 194 are connected to the motor wires 176, 177 and 178, respectively.

When the traverse motor 63 is to be operated at its low speed and in the reverse direction, circuit wire 192 is connected to the motor wire 174 through switch 191 while circuit wire 193 is connected to the motor wire 173 through switch 190 and circuit wire 194 is connected to the motor wire 175 through switch 189. Of course, the three switches 179, 180 and 181 are closed.

It will be obvious from the above that high-speed operation of the traverse motor 63 in the reverse direction is merely accomplished by closing switches 182 to 185, inclusive, while switches 179, 180 and 181 are opened.

Low voltage control circuits are provided for the various switches referred to above in connection with the circuits for the pouring machine traverse motor 63. The two branch wires 195 and 196 extend from the main power lines 169 and 171 to the two terminals of the primary winding 197 of a transformer. The two terminals of the secondary winding 198 of this transformer are connected to the two main feed wires 199 and 200 for the control circuits.

The pouring machine traverse motor control system includes several circuits that are connected to the main feed wires 199 and 200. The four main control circuits are the forward circuit 201, the reverse circuit 202, the low-speed circuit 203 and the high-speed circuit 204. In addition, there are the secondary circuits 205, for switching the forward traverse from low speed to high speed, and 206, for switching the reverse traverse from low speed to high speed.

The main forward circuit 201 is normally open at switch 207 that is closed by the initial depression of the forward pedal 130. This main forward circuit 201 is normally closed by the limit switch 132 and by the solenoid operated switch 208. A solenoid coil 209 is connected in this main forward circuit 201.

The main reverse circuit 202 is normally open at switch 210 that is closed by the initial depression of the reverse pedal 131. This reverse circuit 202 is normally closed by the limit switch 133 and by the solenoid operated switch 211. A solenoid coil 212 is connected in this circuit 202.

The main low-speed circuit 203 is normally closed at the solenoid operated switches 213 and 214 and is normally open at the solenoid operated switch 215. The solenoid coil 216 is connected in this low-speed circuit 203.

The main high-speed circuit 204 is normally open at the solenoid operated switch 217 and at the solenoid operated switch 218. This circuit is normally closed at the solenoid operated switch 219. A solenoid coil 220 is connected in this circuit. It will be noted that a branch wire 221 bridges across the high-speed and low-speed circuit wires 203 and 204 so that either of the solenoid switches 215 and 218 is capable of closing this portion of the high-speed circuit 204.

The secondary switch-over circuits 205 and 206 are connected in parallel to the common wire 222 which is connected to the high-speed circuit 204 and, also, to the low-speed circuit 203 through the medium of the branch wire 221. A solenoid coil 223 is connected in the common wire 222. The forward switch-over circuit 205 is normally open at switch 224 which is moved into its closed position by the further depression of the forward pedal 130. The reverse switch-over circuit 206 is normally open at switch 225 which is moved into its closed position by the further depression of the reverse pedal 131.

For the purpose of keeping the wiring diagram in the simplest form possible, no attempt has been made to illustrate fuses, overload relays, and other similar protective instrumentalities which are used in the actual installation of this type of electrical systems. It, also, will be understood that numerous magnetic relays and other types of circuit making and breaking devices will be employed in place of the solenoid operated switches which are diagrammatically illustrated for the sake of simplicity and clarity.

Let it now be assumed that the operator of the pouring machine desires to effect its traverse in the forward direction and at the low speed. He brings about this operation by partially depressing the forward pedal 130. This movement of the pedal is sufficient to close switch 207 while leaving switch 224 open.

The closing of circuit 201 energizes the switch actuating solenoid coil 209 with the result that switch 211 is opened and switch 215 is closed. The closing of switch 215 energizes the low-speed control circuit 203 with the result that the switch operating coil 216 is energized. Operation of this coil results in closing the three switches 179, 180 and 181 for the low-speed wires 173, 174 and 175 leading to the traverse motor 63. Energizing of the coil 216 also results in opening switch 219 for breaking the high-speed circuit 204. The energizing of switch operating coil 209, by the closing of the main forward circuit 201, also, brings about closing of the switches 186, 187 and 188 for the three supply wires 192, 193 and 194.

Let it now be assumed that the operator of the pouring machine desires to effect traverse of the same in the forward direction but at the high speed. This is accomplished by further depressing pedal 130. The switch 207 in the main forward circuit 201 remains closed and switch 224 is now closed by this further depressing of pedal 130.

The secondary switch-over circuit 205 is closed and the switch operating coil 223 is energized. Actuation of this last-mentioned coil causes switch 213 to open and switch 217 to close. The opening of switch 213 breaks the low-speed circuit 203 and deenergizes the switch operating coil 216 with the result that switch 219 is again closed and switches 179, 180 and 181 are opened. The closing of switch 217 completes the high-speed circuit 204 through the branch wire 221 with the result that the switch operating coil 220 is energized for opening switch 214 and for closing the main motor control circuit switches 182 to 185, inclusive.

It will be understood that the operator can return the pouring machine to its low speed, forward traverse by merely permitting the pedal 130 to return to its partially depressed position. It, also, will be understood that if the pouring machine overtravels in the forward direction, the limit switch 132 will be actuated to break the main forward circuit 201 for stopping the machine.

Let it now be considered that the operator of the pouring machine desires to effect its travel in the reverse direction and at its low speed. This is brought about by partially depressing the reverse pedal 131.

The main reverse circuit 202 is now closed by the switch 210 and switch operating coil 212 is energized. Actuation of this last-mentioned coil opens the main forward circuit switch 208 and closes switch 218 that completes the low-speed circuit 203 through the medium of the branch wire 221. Energizing of coil 212, also, results in closing of the main motor circuit switches 189, 190 and 191. Closing of the low-speed circuit 203 energizes the switch operating coil 216 for closing the main motor circuit switches 179, 180 and 181 and for opening the high-speed circuit 204 by opening switch 219.

When the operator desires to have the pouring machine travel in the reverse direction at high speed, he further depresses pedal 131. Switch 210 remains closed and switch 225 is now closed.

The closing of the secondary switch-over circuit 206 results in energizing the switch operating coil 223. Actuation of this coil brings about closing of switch 217 and opening of switch 213. The main high-speed circuit 204 is closed by switch 217 for energizing the switch operating coil 220. This last-mentioned coil is not actually energized until switch 219 is closed as a result of the breaking of the low-speed circuit 203 by the opening of switch 213. Energization of coil 220 brings about closing of the main circuit control switches 183 to 185, inclusive, for the traverse motor 63.

It will be appreciated that the operator may cause the pouring machine to return to the low-speed reverse traverse condition by permitting the pedal 131 to return to its partially depressed position.

Fig. 23 also discloses the circuits for the two handle carried push-button switches 116 and the valve operating solenoids 154 and 155. As these circuits were described in connetcion with Fig. 20, no further discussion of the same will be presented at this point.

Fig. 23 also discloses the main current supply wires 226, 227 and 228 for the fluid pressure pump driving motor 143 that is illustrated in Fig. 20. These main circuit wires are opened and closed by the triple-pole switch 229 that is actuated by the coil 230.

This switch actuating coil 230 is connected in the main control circuit 231 and the holding circuit 232. The main control circuit 231 is provided with a normally open start switch 233 and a normally closed stop switch 234. A normally open switch 235 is provided in the holding control circuit 232.

When the operator desires to start the fluid pressure pump 145, he depresses the push-button of the switch 233. This closes the control circuit to the coil 230. Energization of this coil brings about operation of the two switches 229 and 235 for closing the main supply circuits 226, 227 and 228 as well as the holding circuit 232. The operator may then release the push-button of the switch 233 and the circuit to the coil 230 will be maintained through the holding circuit 232. When the operator desires to stop the pump 145, he presses the button of the push-button switch 234 and in that way breaks the circuit to the coil 230.

Fig. 24 diagrammatically discloses an electric motor 236 that is employed for driving the mold conveyor. This motor is supplied with current through the three main wires 237, 238 and 239 that are controlled by the triple-pole switch 240. This switch is actuated by the coil 241 connected in the main control circuit 242 that is provided with a normally open start switch 243 and a normally closed stop switch 244. A holding circuit 245, having a normally open switch 246 connected therein, parallels the main control circuit 242.

When the operator of the pouring machine desires to start up the mold conveyor, he depresses the push-button of switch 243. This closes the main control circuit 242 and energizes coil 241 for closing the triple-pole switch 240. The switch 246 in the holding circuit 245, also, is closed. The operator may then release the button of switch 243 and the mold conveyor motor 236 will continue to operate. When the operator desires to stop the mold conveyor, he need only press the push-button of switch 244 and the circuit to the coil 241 will be broken.

It will be seen that the previously referred to limit switch 139 is connected in the main control circuit 242. Therefore, when the pouring machine overtravels in the forward direction, or reaches its limit of operation, the switch 135 will be actuated to break the control circuit 242 for stopping the mold conveyor motor 236.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A continuous pouring machine for traveling mold conveyors, comprising a main frame, means for pivotally supporting the inner end of said frame, means for supporting the outer end of said frame for travel in forward and reverse directions through an arcuate path, an operator's platform formed on the outer end portion of said frame, a carriage mounted for longitudinal travel along the middle portion of said frame, power means for moving said carriage controlled from the operator's platform, a pouring ladle rockably supported by the carriage, means for rocking the ladle controlled from the operator's platform, means at the pivoted end of the frame for receiving molten metal from a furnace, and a trough for conveying the metal from the receiving means to the ladle.

2. A continuous pouring machine for traveling mold conveyors, comprising a main frame, means for pivotally supporting the inner end of said frame, means for supporting the outer end of said frame for travel in forward and reverse directions through an arcuate path, an operator's platform formed on the outer end portion of said frame, a carriage mounted for longitudinal travel along said frame, power means for moving said carriage controlled from the operator's platform, a yoke, means for suspending the yoke from the carriage for pivotal movement about a vertical axis, a pouring ladle rockably supported by the yoke, a shaft connected to the ladle and extending to the operator's platform, a handle on the outer end of said shaft for moving the latter to rock the ladle and to pivot said yoke, means at the pivoted end of the frame for receiving molten metal from a furnace, and a trough for conveying the metal from the receiving means to the ladle.

3. A continuous pouring machine for traveling mold conveyors, comprising a main frame, means for pivotally supporting the inner end of said frame, an arcuate base underlying the outer end portion of said main frame, a track rail supported by the base, supporting wheels attached to the outer end portion of the main frame for travel in forward and reverse directions along the track rail, drive means operatively associated with the main frame and arcuate base for moving the main frame in opposite directions relative to the arcuate base, a carriage mounted for longitudinal travel along the frame, power means for moving said carriage controlled from the main frame, a pouring ladle rockably supported by the carriage, means for rocking the ladle controlled from the main frame, means at the pivoted end of the frame for receiving molten metal from a furnace, and a trough for conveying the metal from the receiving means to the ladle.

4. A machine for pouring molds moving along an arcuate run of a mold conveyor, comprising a main frame positioned to straddle said arcuate run, means for supporting said frame for horizontal pivotal travel in forward and reverse directions about an axis that coincides with the center of said arcuate run, means carried by the main frame for driving the latter at different speeds in each of said forward and reverse directions, a ladle having a side pouring spout, means supporting the ladle on said main frame for horizontal movements which will cause its pouring spout to move both transversely and longitudinally of the arcuate conveyor run to permit the spout to be vertically registered with differently positioned sprue holes in successive molds, means on the main frame for effecting and controlling said movements of the ladle, means supported on the pivoted end of said main frame for receiving molten metal from a furnace, and a trough for conveying the metal from the receiving means to the ladle.

5. A machine for pouring molds moving along an arcuate run of a mold conveyor, comprising a main frame positioned to straddle said arcuate run, means for supporting the inner end of said frame for pivotal movement about a vertical axis that coincides with the center of said arcuate run, an arcuate base positioned outside of said arcuate run and underlying the outer end portion of said frame, means for supporting the outer end portion of the frame on the arcuate base for travel in forward and reverse directions therealong, a variable speed reversible drive unit mounted on said frame and including a toothed drive sprocket, traction means carried by said arcuate base and meshing with the teeth of the drive sprocket, means carried by the main frame for rotating the drive sprocket in opposite directions and at different speeds in each of said directions, a ladle having a side pouring spout, means supporting the ladle on said main frame for horizontal movements which will cause its pouring spout to be moved both transversely and longitudinally relative to the arcuate conveyor run to permit the spout to be vertically registered with the differently positioned sprue holes in successive molds, means on the main frame for effecting and controlling said movements of the ladle, means supported on the pivoted end of said main frame for receiving molten metal from the furnace, and a trough for conveying the metal from the receiving means to the ladle.

6. A machine for pouring molds moving along an arcuate run of a mold conveyor, comprising a main frame including a track portion straddling said arcuate run and an operator's platform rigidly attached to the outer end of said track portion, means at the inner end of said track portion for supporting the frame for pivotal movement about a vertical axis that coincides with the center of said arcuate run, a stationary base positioned outside said arcuate run and underlying the platform of said main frame, means for supporting the main frame on said base for movement in forward and reverse directions therealong, means controlled from the operator's platform for driving the frame in said forward and reverse directions, a wheeled carriage mounted on the track portion of the main frame for travel therealong, a hydraulic cylinder and piston assembly controlled from the operator's platform for moving said carriage along the track portion of the main frame, a pouring ladle, means for supporting the ladle on the carriage for movements about vertical and horizontal axes, an operating shaft extending from the ladle to the operator's platform for effecting said movements of the ladle, means supported on the said track portion of the main frame for receiving molten metal from a furnace, and means for conveying the metal from the receiving means to the ladle.

7. A machine for pouring molds moving along an arcuate run of a mold conveyor, comprising a main frame including a track portion straddling said arcuate run and an operator's platform rigidly attached to the outer end of said track portion, means at the inner end of said track portion for supporting the frame for pivotal movement about a vertical axis that coincides with the center of said arcuate run, a stationary base positioned outside said arcuate run and underlying the platform of said main frame, means for supporting the main frame on said base for travel in forward and reverse directions therealong, means controlled from the operator's platform for driving the frame in said forward and reverse directions, a wheeled carriage mounted on the track portion of the main frame for travel therealong, hydraulic cylinder and piston means controlled from the operator's platform for moving said carriage along the track portion of the main frame, a pouring ladle, a yoke, means for suspending the yoke from the carriage for pivotal movement about a vertical axis, means for supporting the ladle on said yoke for rocking movement about a horizontal axis, a shaft connected to the ladle coaxially of its horizontal rocking axis and extending to the operator's platform, a handle on the platform end of said shaft for actuating the latter to rock the ladle and pivot said yoke, means supported on the said track portion of the main frame for receiving molten metal from a furnace, and means for conveying the metal from the receiving means to the ladle.

8. In a continuous pouring machine for traveling mold conveyors, the improvement which comprises a main frame, having a track portion and an operator's platform, adapted to travel in forward and reverse directions relative to the length of a run of a mold conveyor, a wheeled carriage mounted on the track portion of the main frame for travel therealong, a yoke suspended from the carriage for pivotal movement about a vertical axis, a pouring ladle, means for supporting the ladle on the joke for rocking movement about a horizontal axis, a shaft, extendible and contractible as to length, connected to the ladle at one end and extending in alinement with the horizontal rocking axis of the ladle to terminate at its outer end in operative relation to the said platform, means for supporting the last-mentioned end of the shaft for horizontal movement, and an operating handle mounted on the last-mentioned end of the shaft.

9. A continuous pouring machine for traveling mold conveyors, the improvement which comprises a main frame adapted to travel in forward and reverse directions about a vertical axis that coincides with the center of an arcuate run of a mold conveyor, a wheeled carriage mounted on the main frame for travel therealong in inward and outward directions radially of the aforesaid vertical axis, a yoke suspended from the carriage for pivotal movement about a vertical axis, a pouring ladle, means for supporting the ladle on the yoke for pivotal movement about a horizontal axis, means mounted on one end of the main frame for receiving molten metal from a furnace, and a trough for conveying the metal from the receiving means to the ladle.

BEAUFORD E. GAVIN, Sr.

REFERENCES CITED

The following references are of record in the file of this patent:

UNITED STATES PATENTS

| Number | Name | Date |
| --- | --- | --- |
| 576,995 | Baker | Feb. 16, 1897 |
| 733,253 | McDowell | July 7, 1903 |
| 862,364 | Williams | Aug. 6, 1907 |
| 1,553,334 | Sklovsky | Sept. 15, 1925 |
| 1,666,910 | Poske | Apr. 24, 1928 |
| 1,683,472 | Lane | Sept. 4, 1928 |
| 1,905,204 | Zinno | Apr. 25, 1933 |
| 2,104,406 | Sorensen et al. | Jan. 4, 1938 |